Jan. 28, 1958  G. FRANCIS  2,821,288
CARPORT PARKING DEVICE
Filed Sept. 27, 1956  2 Sheets-Sheet 2
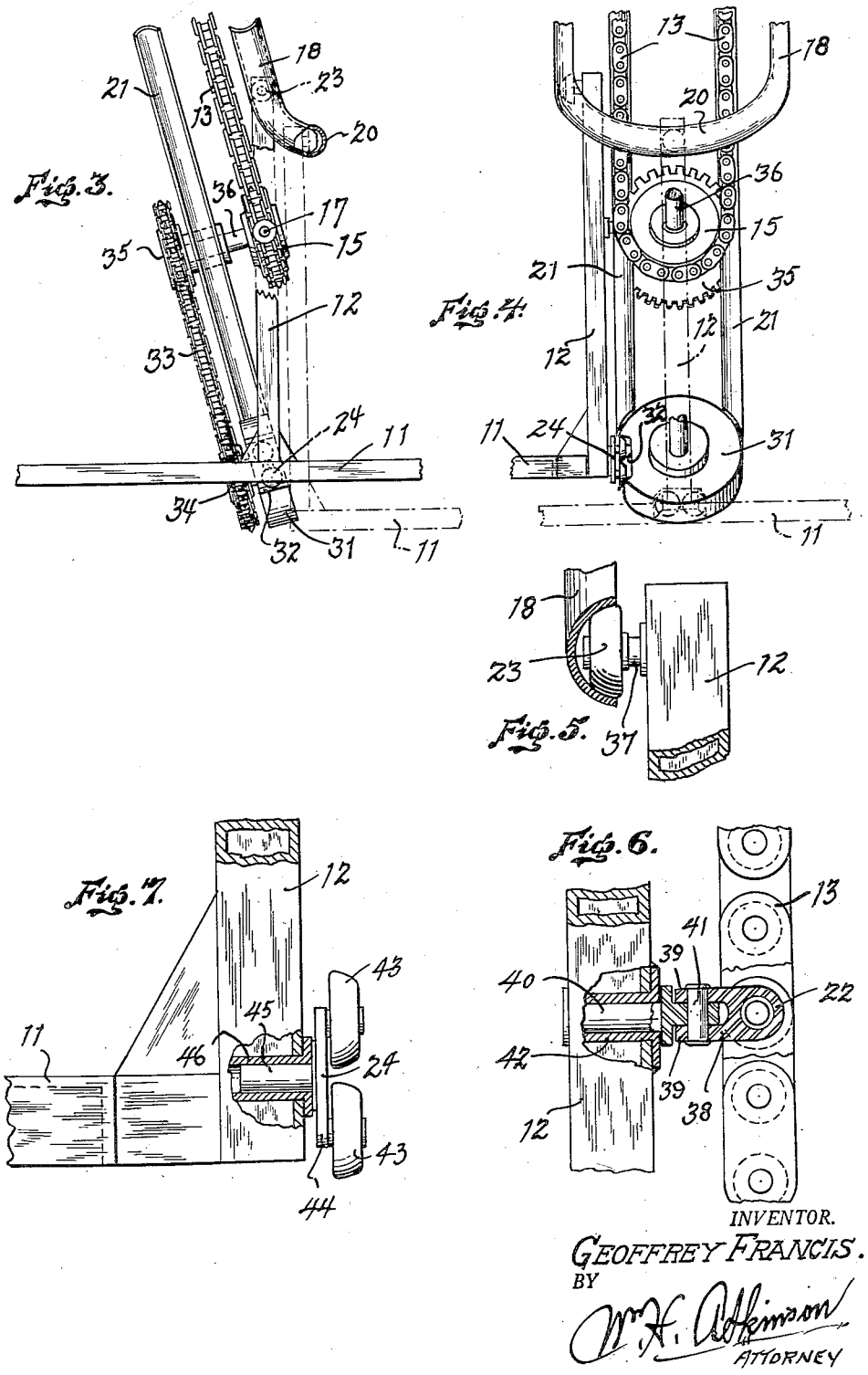
INVENTOR.
GEOFFREY FRANCIS.
BY
Wm H. Atkinson
ATTORNEY United States Patent Office 2,821,288
Patented Jan. 28, 1958

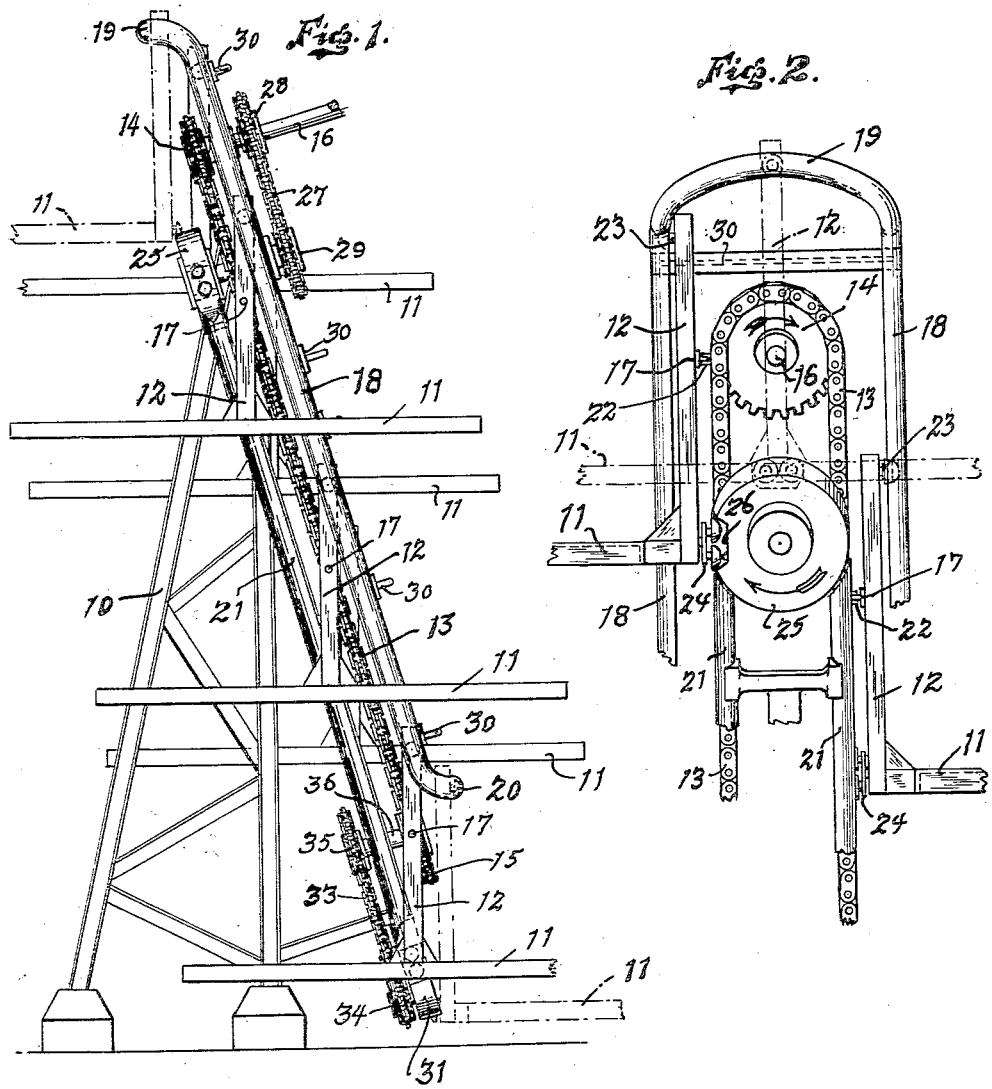

2,821,288

CARPORT PARKING DEVICE

Geoffrey Francis, San Francisco, Calif.

Application September 27, 1956, Serial No. 612,507

10 Claims. (Cl. 198—158)

My present invention relates to an improved automobile parking device and more particularly to a mechanical means by which the capacity of a parking lot may be increased where property values, space limitations and other considerations make the use of a conventional garage structure impractical.

The main object of my invention is to provide an automobile parking means upon which a plurality of automobiles may be parked one above the other in a practical and novel manner.

A further object of the invention is to provide an automobile parking and storing device in which a number of automobiles are stored or parked upon individual pallets that move in inclined paths at opposite sides of a supporting structure.

Another object of the invention is to provide a new and novel form of automobile parking device in which a plurality of automobile supporting platforms or pallets connected to a continuous belt or chain are moved in inclined planes at opposite sides of a supporting structure and in which said platforms and pallets are supported and held in said inclined planes by oppositely acting guide rails in such a manner that the necessity for a complicated transfer mechanism for the transposition of the automobile supporting platforms or pallets from one to the other side of said supporting structure and without disconnection from said belt or chain is avoided in a novel manner.

Another object of the invention is to provide an automatic automobile parking device having a plurality of automobile supporting platforms or pallets suspended in a novel manner to move upwardly escalator fashion to a point where the platforms or pallets turn about for descent to the parking lot in the same fashion so that an automobile driven directly upon a supporting platform or pallet for parking can be driven forward from its supporting platform or pallet and deparked for exit at its point of entry.

Another object of my invention is to provide a mechanical automobile parking device that may be set up in a parking lot and employed to park a greater number of automobiles than would be possible within the ground area occupied by the parking device and featured by the fact that the automobiles are parked upon individual platforms and turned about so that the automobile may be driven forward upon and from its supporting platform without backing or other complicated maneuvering.

A further and more particular object of my invention is to provide an automobile parking device of the character disclosed in my co-pending application Serial Number 594,916 filed June 29, 1956, and entitled, "Multiple Automobile Parking Device," in which the automobile supporting pallets of substantially identical form are supported for travel along inclined paths along opposite sides of a supporting structure without trolleys and a guiding trackway.

Other objects and advantages will be in part evident to those skilled in the art and in part pointed out hereinafter in connection with the accompanying drawings wherein there is shown by way of illustration and not of limitation a practical embodiment of the invention.

In the drawings wherein like numerals refer to like parts:

Figure 1 is a side elevation of a device constructed in accordance with a preferred embodiment of the invention, Figure 2 is a fragmentary view looking to the right and showing details at the upper part of the device as shown in Figure 1, Figures 3 and 4 are fragmentary views showing details of construction at the lower end of the device as shown in Figure 1 of the drawings, and Figures 5, 6 and 7 are fragmentary views showing other details of construction employed in the device as illustrated in Figure 1 of the drawings.

Many automobile parking and storing structures involving a plurality of automobile supporting platforms that move upwardly and downwardly in companion shafts such as are common in elevator service have been proposed, but these arrangements generally require a building and a complicated means or mechanism operating in synchronism with the vertical movements of the loaded pallets for transferring the pallets one at a time from one to the other of said shaftways. In an arrangement not requiring a building structure or associated shaftways, I have shown in my Patent No. 2,682,958 granted July 6, 1954, entitled, "Automobile Parking Facility," a vertically extending frame upon which automobile accommodating pallets are supported for movement upwardly and downwardly along opposite sides of a supporting frame in an open parking lot and without other shaftway guides. This patent, however, requires special rotatably supported rail sections at the upper and lower ends of the supporting frame for transferring the pallets from one to the other side of the supporting frame for their upward and downward travel. In accordance with this patent, the pallet being transferred is supported upon co-extending trackways independently of the main vertical guide rails at the sides of the supporting frame. In operation the rotatable rail sections are turned with respect to the main supporting frame through a stop motion or Geneva gearing operating in timed relation with the movements of the pallets as moved between the base and top of the supporting frame.

In accordance with the present invention and as distinguished from the above, the transitional movement of the pallets from one to the other side of the supporting frame is accomplished by a single guide rail and a towing chain in a new and novel manner and without resort to any additional pallet turning means for transferring the pallets from one to the other side of the supporting frame.

For a detailed description, reference is now made to Figure 1 of the accompanying drawings which illustrates, in side elevation, the essential features of a preferred embodiment of the invention. In this arrangement, the numeral 10 designates a relatively narrow vertically extending supporting frame upon which a plurality of pallets 11 are supported for movement upwardly along one side thereof and downwardly at the other side. The pallets 11, as in my above co-pending application, have vertically extending masts 12 by which they are supported in cantilever fashion as they move upwardly and downwardly along the opposite sides of the supporting frame 10. In this instance as in the aforesaid co-pending application and as shown in my above identified patent, the movements of the pallets 11 are controlled by a chain 13 which passes over aligned sprockets 14 and 15 located respectively at the top and bottom of the supporting frame 10. In this instance, however, the pallets are guided along the sides of the supporting frame 10 in a radically different manner. The sprockets 14 and 15 are shown as operating about an inclined axis in such a manner that the chain 13 will move and operate in an inclined plane. The sprocket 14 is carried by a driving shaft 16 to which a driving force may be imparted by any suitable means, as for example an electric motor. A feature of this arrangement is that the chain 13 is connected to each pallet supporting mast 12 at a point 17 intermediate their ends. Disposed outwardly and above the plane in which the towing chain 13 operates there is a guide rail 18, that is in the form of a continuous or closed loop having circular ends and parallel side portions extending throughout substantially the distance between the sprockets 14 and 15. At its upper end, this guide rail 18 is curved as at 19 so as to maintain a condition of substantial parallelism with the chain connection point 17 upon the masts as the pallets are carried around from one to the other side of the supporting frame 10. At its lower end, the guide rail 18 is curved in a similar manner as at 20 so as to, in like manner, maintain a substantially parallel or uniformly spaced relation with the points 17 of the masts 12 as the pallets are carried around the lower end of the supporting frame 10 by the towing chain 13. With this slight incline in the chain path, the load carried by the pallets 11 will be supported substantially in its entirety by the towing chain 13 and the guide rail 18 will merely function in conjunction with the chain 13 to maintain the masts 12 in a substantially vertical position so that the pallets, as a consequence, will be maintained in a horizontally extending plane. To stabilize the masts 12 at points along the chain 13 between the sprockets 14 and 15, there are two oppositely disposed stabilizing rails 21 that are engaged by means at the lower ends of the masts 12 and substantially at the level of the pallets 11. These stabilizing rails 21 are disposed in a parallel plane below the plane in which the towing chain 13 operates. As will hereinafter appear, these stabilizing rails serve in conjunction with the guide rail 18 to maintain the pallets in their outwardly extending horizontal position at the sides of the supporting frame 10.

By now referring to Figure 2 of the drawings, the connection between the mast 12 and the towing chain 13 is accomplished by means of an articulated universal connection 22 which will permit the masts to assume different positions with respect to the towing chain 13 as it moves around the sprockets 14 and 15. At the upper ends of the pallet supporting mast 12, there is an outwardly extending roller 23 that is adapted to roll along the inner surface of the continuous or looped guide rail 18 and at the lower ends of the masts 12 there is a multiple roller assembly 24 that is mounted on the inner side of the masts 12 and extends inwardly for rolling engagement with one or the other of the spaced stabilizing rails 21, which latter are shown in this figure of the drawing as disposed below and in substantially parallel relation with the path of the towing chain 13. With the guide rail 18 formed as a continuous and closed circuit loop and with the stabilizing rails 21 spaced at their ends, a means for stabilizing the pallets between the spaced ends at the upper end lower limits of the stabilizing rails 21 must be provided to maintain the masts 12 in their required vertical position as the universal connection 22 between the masts 12 and the towing chain 13 travels around the outer peripheries of the sprockets 14 and 15. This means is shown at the upper end of the supporting frame 10 as a disc or drum-like member 25 that has a recess or pocket 26 into which the pallet stabilizing means 24 at the lower ends of the masts 12 will engage as it moves out of engagement with the stabilizing rail 21 in its upward movement. In this arrangement, it will be seen that with the drum-like member 25 rotating in the direction indicated by arrow and in synchronism with the sprocket 14, the notch or pocket 26 will maintain a uniformly spaced relation with the articulated universal connection 22 between the towing chain 13 and the mast 12 during that period of travel when the universal connection 22 is being carried around the periphery of the sprocket 14. In this figure of the drawings, the pallet 11 at the left is shown as entering the zone of transition where it will be transferred over to the right hand side of the supporting frame 10 and by dot and dash lines the pallet 11 with its supporting mast 12 is shown as in an intermediate position to more clearly illustrate the manner in which the seat 26 is maintained in substantially uniformly spaced relation with the curved portion 19 of the guide rail 18. By now referring back to Figure 1 of the drawings, it will be noted that the drum 25 with its pallet guiding recess or pocket 26 is driven in synchronism with the towing chain 13 by means of a connecting chain 27 that operates around a sprocket 28 carried by the shaft 16 and a sprocket 29 which is mounted upon a shaft upon which the drum 25 is mounted. It will also be noted that the guide rail is supported upon transversely extending spacing bars 30 which connect at spaced points with the supporting frame 10.

As a counterpart for the pallet stabilizing drum with its guide recess or pocket 26, at the upper ends of the stabilizing rails 21, there is a similar rotatable drum 31, more clearly shown in Figures 3 and 4 of the drawings, that has a recess or pocket 32 into which the stabilizing rollers 24 at the base of the mast 12 engage. In this instance, the drum 31 is mounted upon a shaft that is driven by means of a connecting chain 33 which extends around a sprocket 34 upon the shaft that carries the drum 31 and is driven by a sprocket 35 mounted upon the shaft 36 upon which the towing chain supporting sprocket 15 is mounted.

In the above described arrangement, as in my said earlier patent, the automobiles may be driven forward upon a supporting pallet at one side of the frame when being parked and when being deparked, the automobiles may likewise be driven forward from the pallet at the other side of the frame. In this manner the points of entry and exit of the parking facility are at a most convenient point for economic operation of the device in a limited space.

As is more clearly shown in Figure 5 of the drawings, the guide rail engaging means 23 at the upper end of the masts 12 is mounted for rotation about a stub shaft 37 that extends from the outer side of the pallet supporting mast 12. As here indicated the continuous guide rail 18 is of semi-circular cross-section and is disposed with its open side inward with respect to the supporting frame 10. The guide rail engaging means 23 is here illustrated as a single roller 23 that is contoured and dimensioned so that it will have a free rolling action as it is carried around through a complete circuit of the guide rail 18 under the influence of the towing chain 13.

In Figure 6, there is shown a simple form of articulated or universal type of connecting means between the towing chain 13 and the masts 12. In this instance the chain is of the roller type and one of the rollers of the towing chain 13 is extended outwardly to form a bifurcated portion 38 with spaced ears 39 between which an extending swivel member 40 is secured by means of a pin 41. With this construction, it will be seen that the bifurcated extension 38 of the chain link will have a limited pivotal movement as the chain moves about the sprockets 14 and 15 and due to the incline of the path of the towing chain 13, the swivel member 40 will turn about the pin 41 and also pivot within a socket 42 of the mast 12 within which the swivel member 40 is rotatably mounted. This is considered one of the simplest forms of universal connection and while it has been found to operate entirely satisfactory, the applicant has developed a number of other articulated universal connection forming means which will be the subject matter of an application for patent now in contemplation.

In Figure 7 of the drawings, the stabilizing rail engaging means or assembly 24 at the lower end of the pallet supporting mast 12 is shown as in the form of two stabilizing rail engaging rollers 42 that are contoured to operate in tandem and in rolling contact with the convex surface of the stabilizing rails 21 which, as is illustrated in Figure 3 of the drawings, is exposed outwardly with respect to the supporting frame 10. To provide for a following of the spaced stabilizing rails 21 and a smooth transfer thereof from the ends of the stabilizing rails to the rotatable drums 25 and 31 respectively at the upper and lower ends of the stabilizing rails 31, these rollers 43 are mounted upon a support 44 carried by a stub shaft 45 that is journalled within bearing bushing 46 so that the two rollers may follow each other in their travel along the stabilizing rails 21 and around the outer surfaces of the drums 25 and 31.

The device as illustrated in the drawings and described above has for simplicity been limited to a showing of six of the automobile supporting pallets 11, but it will be understood that the number of these pallets may be increased where desired and space limitations might permit. The inclination of the spaced parallel planes of the pallet towing chain 13, the closed loop guide rail 18 and the stabilizing rails 21, here illustrated as at an angle of approximately 15° off vertical, may also be varied. When finally installed for operation, it is also contemplated that power will be applied to the apparatus through the shaft 16 by means of an electric motor under the control of push buttons and interlocking limit switches where the latter may be found desirable.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In an automobile parking device of the character described, the combination of a supporting frame, a power transmitting means operating along inclined paths spaced outwardly at the opposite sides of said supporting frame, a plurality of pallets having upstanding masts at their inner sides and a driving connection with said power transmitting means, a continuous guide means disposed above and outwardly in substantially parallel relation with the path travelled by said power transmitting means, means at the upper ends of the masts carried by said pallets engaging the inner side of said continuous guide means, a pair of spaced stabilizing rails disposed below and extending in spaced parallel relation with the path travelled by said power transmitting means, and means at the lower ends of said masts engaging the outer sides of said stabilizing rails, the upstanding masts of each of said pallets being connected to said driving means intermediate their ends and between said guide channel and said stabilizing rail engaging means by a universal power transmitting connection, whereby said masts will support said pallets in cantilever fashion between said guide means and said stabilizing rails as they are moved upwardly and downwardly at the sides of said supporting frame by said power transmitting means.

2. In an automobile parking device of the character described, the combination of a supporting frame, a power transmitting chain encircling said supporting frame and movable along inclined paths spaced outwardly at the opposite sides of said supporting frame, a plurality of pallets having upstanding masts at their inner sides, means intermediate the upper and lower ends of said masts forming a universal driving connection between said masts and said power transmitting chain, a continuous guide rail disposed above and outwardly in substantially parallel relation with the path travelled by said power transmitting means, means at the upper ends of the masts carried by said pallets engaging said continuous guide rail, a pair of spaced stabilizing rails disposed directly below and extending in parallel relation with the path travelled by said power transmitting chain along the sides of said supporting frame, and means at the lower end of said masts engaging the outer sides of said stabilizing rails, whereby said masts in cooperation with said guide rails and said stabilizing rails will support said pallets in cantilever fashion as they are moved upwardly and downwardly at the sides of said supporting frame by said power transmitting chain.

3. In an automobile parking device of the character described, the combination of a vertically extending supporting frame, a power transmitting means operating in inclined paths spaced outwardly along opposite sides of said supporting frame, a plurality of pallets movable upwardly along an inclined path at one side and downwardly in a similarly inclined path at the other side of said supporting frame, each of said pallets having a mast at their inner sides extending upwardly adjacent said supporting frame, means intermediate the ends of said masts forming a universal driving connection directly with said power transmitting means, a continuous guide rail disposed above and outwardly in substantially parallel relation with the path travelled by said power transmitting means, means at the upper end of each of the masts engaging said continuous guide rail, a pair of spaced stabilizing rails extending in parallel relation one at each side of said supporting frame and disposed below the path travelled by said power transmitting means, and means carried by said masts at the level of said pallets engaging said stabilizing rails, whereby said masts will support said pallets in cantilever fashion between said guide rail and one of said stabilizing rails as they are moved upwardly and downwardly along the sides of said supporting frame by said power transmitting means.

4. In an automobile parking device of the character described, the combination of a vertically extending supporting frame, a power transmitting chain operating between two spaced sprockets and in inclined paths spaced outwardly along opposite sides of said supporting frame, a plurality of pallets movable upwardly at one side and downwardly at the other side of said supporting frame, each of said pallets having an upstanding mast at the side adjacent said supporting frame, means intermediate the ends of said masts forming a universal articulated connection with said power transmitting chain, a continuous guide rail disposed above and outwardly in substantially parallel relation with the path travelled by said power transmitting chain having a roller guiding surface facing said supporting frame, roller means at the upper end of each of the masts carried by the said pallets engaging the roller guiding surface of said continuous guide rail, a pair of stabilizing guide rails extending in spaced parallel relation below the path travelled by said power transmitting chain, means carried by said masts at the level of said pallets engaging said stabilizing rails, whereby said masts will support said pallets in cantilever fashion between said guide rail and one of said stabilizing rails as they are moved between said spaced sprockets along the sides of said supporting frame by said power transmitting chain, and means operating in timed relation with the movements of said pallets engageable by the stabilizing rail engaging means carried by said masts and cooperating with said continuous guide rail for stabilizing and directing said pallets around said supporting frame as they are carried from one to the other side of said supporting frame by said power transmitting chain.

5. In an automobile parking device of the character described, the combination of a relatively narrow supporting frame, a sprocket journalled for rotation in an inclined plane at the upper end of said supporting frame, a second sprocket journalled at the base of said frame for rotation in the plane of said first sprocket, said sprockets each having a pitch diameter greater than the width of said supporting frame, means for driving said sprockets, a continuous operating chain carried by said sprockets and movable about said supporting frame in an inclined plane through which said supporting frame extends, a plurality of spaced and horizontally disposed pallets each having a vertical suspension mast at its inner side, a universal driving connection between said chain and each of said suspension masts intermediate their ends and at spaced points along said chain, oppositely extending guide rail engaging means carried by said masts above and below said universal driving connections between said masts and said chain, and oppositely disposed guide rails extending in inclined and spaced parallel planes above and below the plane in which said operating chain moves with which said oppositely extending rail engaging means carried by said masts respectively engage, whereby said pallets will be supported cantilever fashion by said suspension masts as the guide rail engaging means carried thereby are moved along said oppositely disposed guide rails by said continuous operating chain.

6. In an automobile parking device of the character described, the combination of a supporting frame, a pallet towing chain encircling said supporting frame and operating in an inclined plane between aligned sprockets journalled in spaced relation upon said supporting frame, said sprockets having a pitch diameter greater than the width of said supporting frame, whereby said chain will operate along inclined parallel paths upwardly along one side of said frame and downwardly along the other side thereof as it moves about said sprockets, a plurality of horizontally disposed pallets each having a vertically extending mast at one side thereof, a universal driving connection at spaced points along said pallet towing chain and a point intermediate the ends of each of said masts, a continuous guide rail supported by said frame and forming a closed loop disposed in a plane above and extending substantially parallel with the path in which said towing chain moves, a pair of spaced guide rails also carried by said frame in a plane below said towing chain and extending substantially parallel with that portion of said towing chain between said sprockets, guide rail engaging means at the upper ends of the masts and at the sides of said pallets extending outwardly from said frame for engagement with said continuous guide rail, a second guide rail engaging means at the lower ends of said masts extending toward said frame and engaging said spaced guide rails as the pallets move upwardly and downwardly along opposite sides of said supporting frame, and a rotatable guide means having a speed and diameter corresponding with the pitch diameter of said sprockets disposed between and in the plane of said spaced guide rails engageable by the guide means at the lower ends of said masts and cooperating with said continuous guide rail to maintain said pallets in their normal horizontal position at the upper and lower ends of said frame as the universal connection between said masts and said towing chain traverses that portion of the chain path around said sprockets.

7. In an automobile parking device of the character described, the combination of a narrow supporting frame, a sprocket at the top of said supporting frame journalled for rotation about an inclined axis, a second sprocket at the base of said frame journalled for rotation about an inclined axis parallel to the axis of said first sprocket and operating in alignment therewith, said sprockets each having a pitch diameter greater than the width of said supporting frame, a pallet towing chain carried by said sprockets, means for driving said sprockets, whereby said towing chain will move upward at an angle along one side of said supporting frame and downward at a corresponding angle along the other side of said frame, a plurality of pallets each having a suspension mast extending upwardly adjacent the outer side of said pallet towing chain, means forming an articulated universal connection at spaced points along said chain by which the suspension masts of said pallets are secured intermediate their ends to said chain, guide rail engaging means extending in opposite directions at the upper and lower ends of said masts, and oppositely disposed guide rails located in spaced parallel planes above and below tthe plane in which said chain operates, whereby said pallets will be supported cantilever fashion by said guide rails as the masts are moved along the opposite sides of said supporting frame and between said sprockets by said pallet towing chain.

8. In an automobile parking device of the character described, the combination of a narrow supporting frame, a sprocket at the top of said supporting frame journalled for rotation about an inclined axis, a second sprocket at the base of said frame journalled for rotation about an inclined axis parallel to the axis of said first sprocket and operating in alignment therewith, said sprockets each having a pitch diameter greater than the width of said supporting frame, a pallet towing chain carried by said sprockets, means for driving said sprockets, whereby said chain will move upwardly in an inclined path along one side of said supporting frame and downward at a corresponding incline along the other side of said frame, a plurality of pallets each having a suspension mast at one side disposed adjacent to and extending above and below the path in which said pallet towing chain moves, means at spaced points along said chain forming an articulated universal connection by which said suspension masts are secured intermediate their ends to said chain, guide rail engaging means extending in opposite directions at the upper and lower ends of said masts, and oppositely disposed guide rails located in spaced parallel planes above and below the plane in which said chain moves, whereby said pallets will be supported cantilever fashion by said guide rails as they are moved upwardly and downwardly between said sprockets and along opposite sides of said supporting frame by said pallet towing chain.

9. In an automobile parking device of the character described, the combination of a narrow supporting frame, a sprocket at the top of said supporting frame journalled for rotation about an inclined axis, a second sprocket at the base of said frame journalled for rotation about an inclined axis parallel to the axis of said first sprocket and operating in alignment therewith, a pallet towing chain carried by said sprockets along inclined paths at opposite sides of said supporting frame, means for driving said sprockets, whereby said chain will move upwardly along an inclined path between said sprockets at one side of said supporting frame and downward at a corresponding incline between said sprockets at the other side of said frame, a plurality of pallets each having an upwardly extending suspension mast disposed adjacent said chain, means forming an articulated universal connection at spaced points along said chain by which the suspension masts of said pallets are connected to said chain intermediate their ends, guide rails engaging means carried by said masts extending laterally in opposite directions above and below the universal connection with said chain, and oppositely disposed guide rails extending parallel with and in spaced relation above and below the paths in which said chain moves, whereby said pallets will be supported cantilever fashion between said oppositely disposed guide rails as said masts are moved between said sprockets and along the opposite sides of said supporting frame by said pallet towing chain.

10. In an automobile parking device of the character described, the combination of a narrow supporting frame, a sprocket at the top of said supporting frame journalled for rotation about an inclined axis, a second sprocket at the base of said frame journalled for rotation about an inclined axis parallel to the axis of said first sprocket and operating in alignment therewith, a pallet towing chain carried by said sprockets along inclined paths at opposite sides of said supporting frame, means for driving said sprockets, whereby said chain will move upwardly between said sprockets at one side of said supporting frame and downward between said sprockets at the other side of said frame, a plurality of pallets each having an upwardly extending suspension mast disposed adjacent said chain, means forming an articulated universal connection by which the suspension masts of said pallets are connected intermediate their ends at spaced points along said chain, a guide rail engaging roller at the upper end of each of said masts extending outwardly with respect to said supporting frame, a second guide rail engaging roller at the lower ends of each of said masts extending inwardly with respect to said supporting frame, a guide rail formed as a closed loop disposed in an inclined plane parallel with and outwardly above the plane in which said chain operates having its upper and lower portions curved to conform with the path of the guide rail engaging rollers at the upper ends of said mast as said chain travels around the sprockets at the top and base of said frame, a pair of spaced parallel stabilizing guide rails disposed in a plane parallel with and below the plane in which said chain moves, and means disposed at the upper and lower ends of said stabilizing guide rails operating in synchronism with said sprockets for engaging and transferring said second guide rail engaging roller at the lower ends of said masts from one to the other of said parallel stabilizing guide rails as the guide rail engaging roller at the upper end of said mast is moved through the looped end of said guide rail from one to the other side of the supporting frame by said pallet towing frame.

References Cited in the file of this patent
UNITED STATES PATENTS

| | | |
|---|---|---|
| 2,007,044 | Francis | July 2, 1935 |
| 2,251,121 | Daw | July 29, 1941 |